US005115089A

United States Patent [19]

Yoshida et al.

[11] Patent Number: 5,115,089

[45] Date of Patent: May 19, 1992

[54] PROCESSES FOR PREPARATION OF POLYIMIDE-ISOINDROQUINAZOLINEDIONE AND PRECURSOR THEREOF

[75] Inventors: Masatoshi Yoshida, Oyama; Katsuji Shibata, Shimotsuma; Mitsumasa Kojima; Hidetaka Satou, both of Hitachi; Toshihiko Kato; Yasuo Miyadera, both of Tsukuba; Masami Yusa, Shimodate, all of Japan

[73] Assignee: Hitachi Chemical Co., Ltd., Tokyo, Japan

[21] Appl. No.: 245,157

[22] Filed: Sep. 16, 1988

[30] Foreign Application Priority Data

Sep. 17, 1987 [JP] Japan ................................ 62-233066

[51] Int. Cl.[5] ........................ C08G 69/26; C08G 8/02; C08G 77/06; C08G 75/00

[52] U.S. Cl. ...................................... 528/353; 528/21; 528/23; 528/38; 528/125; 528/126; 528/128; 528/170; 528/171; 528/184; 528/185; 528/188; 528/331; 528/352

[58] Field of Search ................. 528/353, 125, 26, 126, 528/21, 128, 38, 170, 171, 188, 352, 331, 184, 185

[56] References Cited

U.S. PATENT DOCUMENTS

| | | | |
|---|---|---|---|
| 3,435,002 | 3/1969 | Holub | 528/26 |
| 4,064,289 | 12/1977 | Yokoyama et al. | 528/172 |
| 4,066,622 | 1/1978 | Feinstein et al. | 528/188 |
| 4,206,106 | 6/1980 | Heilman et al. | 528/353 |
| 4,338,426 | 7/1982 | Sato et al. | 528/26 |
| 4,485,234 | 11/1984 | Makino et al. | 528/329 |
| 4,847,358 | 7/1989 | Kojima et al. | 528/188 |

FOREIGN PATENT DOCUMENTS

| | | |
|---|---|---|
| 3131907 | 6/1982 | Fed. Rep. of Germany . |
| 48-2956 | 1/1973 | Japan . |

*Primary Examiner*—John Kight, III
*Assistant Examiner*—P. Hampton-Hightower
*Attorney, Agent, or Firm*—Antonelli, Terry, Stout & Kraus

[57] ABSTRACT

Disclosed herein are processes for the preparation of polyimide-isoindroquinazolinediones and precursor thereof. These polymers are useful as heat-resistant electric insulation materials, surface coating films for electronic instrument parts and especially suitable for manufacturing a photoresist. The above precursor is produced by reacting a an alkylenebistrimellitate dianhydride, a diaminoamide compound and the other amine. The precursor is readily dehydrated and ring-closed to produce polyimide-isoindroquinazolinedione, which is often conveniently conducted by producing a varnish of the precursor, applying it onto adequate substrates such as silicon wafers, glass plates, metal plates, etc. and then subjecting the coated film to dehydration. The resulting films have excellent physical properties such as good adherence, high tensile strength, low elasticity, etc.

13 Claims, No Drawings

PROCESSES FOR PREPARATION OF POLYIMIDE-ISOINDROQUINAZOLINEDIONE AND PRECURSOR THEREOF

BACKGROUND OF THE INVENTION

1. Field of the Invention

The present invention relates to processes for the preparation of polyimide-isoindroquinazolinedione and precursor thereof.

2. Prior Art

Hithertofore, polyimide-isoindroquinazolinedione and polyimide have been used as heat-resistant electric insulation materials and also as constructive materials for parts of electronic instruments such as interlayer insulation membranes for semi-conductors, surface protection coating films, -ray shield films and the like. These polymers have been utilized generally in the following manner:

Their precursor solutions were applied onto substrates such as those of silicon wafer, glass plate, metal plate, etc. to form a coated film, which was then subjected to heat-treatment to obtain a partially imidated film; a resist was formed on the film in a desired pattern; the resulting resist was dipped in an etching solution to dissolve and remove unnecessary portions; and the etched resist film was then peeled off and the film subjected to heat-treatment again, thereby being completely cured to form various type of films.

As the above polyimide-isoindroquinazolinediones, the following compounds are already known from prior art, for example, Japanese Patent Publication (Kohkoku) Sho 60-43370 Official Gazette: those obtained by reacting acid dianhydrides such as 3,3',4,4'-biphenyltetracarboxylic acid dianhydride or the like, diaminoamide compounds such as 4,4'-diaminodiphenylether-3-carboxylic acid amide or the like, diaminosiloxanes such as 1,3-bis(aminopropyl)tetramethyldisiloxane or the like, and diamines.

As said polyimides, in addition to those used in the form of the precursor solution mentioned above, polyimides in which the imidation has already been completed and which are soluble in polar solvents such as N-methylpyrrolindone, etc. are known from for example, Japanese Laid-open (Kokkai) Patent Application Sho 61-4700 Official Gazette.

The conventional polyimide-isoindroquinazolinediones as disclosed in the above mentioned Japanese Patent Publication Sho 60-43370 Official Gazette have such a defect as not being application to devices not having a heat-resistance level beyond 250° C., because said polyimide-isoindroquinazolinediones require full curing temperatures exceeding 250° C., practically a temperature of 300-400° C. In addition these conventional polyimide-isoindroquinazolinediones have a higher modulus of elasticity and there is the risk of crack occurrence and peeling off from base materials.

On the other hand, many of the conventional polyimides also requires temperatures exceeding 250° C. for their full curing. Although some polyimides can be cured at a temperature below 250° C., generally, polyimides have a fault of their tensile strength being lower. Further, as polyimides capable of being treated at a temperature below 250° C., there are the polyimide resins having already completed their imidation as disclosed in Japanese Kokkai Patent Application Sho 61-4700 Official Gazette. However, when such polyimides are dipped into an etching solution for the dissolution and removal of unnecessary portions as aforementioned, it is known that speed thereof is very slow as compared with the resins in which only the partial imidation has proceeded [see "Kinō Zairyō" (Functional Materials) Published on May and June, 1984]. Accordingly, such completely imidated polyimides cannot be employed for the uses requiring etching treatment as mentioned before.

SUMMARY OF THE INVENTION

The present invention provides processes for the preparation of polyimide-isoindroquinazolinediones and precursor thereof, such polyimide-isoindroquinazolinediones not having the above-mentioned various defects. Thus, the products of the present invention are excellent in good adherence to substrates such as silicon wafer, metal plate and the like, and which can be subjected to etching treatment, and furthermore, completely cured at a temperature below 250° C. In addition, the present invention provides processes for the preparation of polyimide-isoindroquinazolinedione exhibiting an excellent tensile strength and a low elasticity other than the above characteristics, and precursor thereof.

DETAILED DISCLOSURE OF THE INVENTION

According to the present invention, there are provided processes for the preparation of polyimide-isoindroquinazolinedione and precursor thereof.

A process for the preparation of said precursor, in accordance with the present invention comprises reacting (a) a tetracarboxylic acid dianhydride containing at least 50% by mol of the dianhydride represented by the general formula (I):

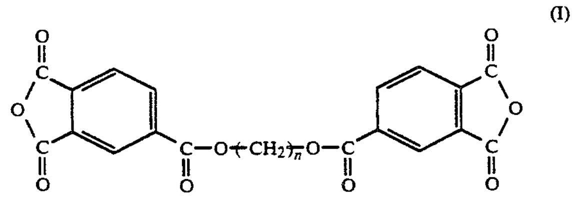

wherein n represents an integer of 2-16, (b) a diaminoamide compound represented by the general formula (II):

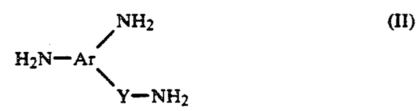

wherein Ar represents an aromatic group, Y represents $SO_2$ or $$-\overset{\displaystyle O}{\overset{\|}{C}}-,$$

and the $Y-NH_2$ group and at least one $-NH_2$ group are bonded to a carbon atom adjacent to the Ar, and (c) an another diamine.

The above resulting polyimidoisoindroquinazoline dione precursor is subjected to dehydration-ring closure reaction to produce polyimide-isoindroquinazolinedione.

The above resulting polyimide-isoindroquinazoline precursor is used preferably in the state of being dissolved in an organic solvent, i.e. as a varnish.

Acid dianhydride represented by the general formula (I) includes ethylenebistrimellitate dianhydride, trimethylenebistrimellitate dianhydride, tetramethylenebistrimellitate dianhydride, pentamethylenebistrimellitate dianhydride, hexamethylenebistrimellitate dianhydride, heptamethylenebistrimellitate dianhydride, octamethylenebistrimellitate dianhydride, decamethylenebistrimellitate dianhydride, hexadecamethylenebistrimellitate dianhydride or the like, and these acid dianhydrides may be used in combination of two or more.

These can be synthesized from anhydrous trimellitic acid chloride and corresponding diols.

In addition, the other acid dianhydrides co-usable with the above acid dianhydride include for example, pyromellitic acid dianhydride, 3,3',4,4' -diphenyltetracarboxylic acid dianhydride, 3,3',4,4'-benzophenonetetracarboxylic acid dianhydride, cyclopentanetetracarboxylic acid dianhydride, 1,2,5,6-naphthalenetetracarboxylic acid dianhydride, 2,3,6,7-naphthalenetetracarboxylic acid dianhydride, 2,3,5,6-pyridinetetracarboxylic acid dianhydride, 1,4,5,8-naphthalenetetracarboxylic acid dianhydride, 3,4,9,10-perylenetetracarboxylic acid dianhydride, 4,4'-sulfonyldiphthalic acid dianhydride, and the like. One or more of these dianhydrides may be used.

Further, these may be used in the range of 50 mol. % or less based on the total mols of the tetracarboxylic acid dianhydride. If they are used in excess of 50 mol. %, their curing temperatures will exceed 250° C., which is not preferred.

As diaminoamide compounds represented by the general formula (II), for example, the compounds indicated by the following chemical structural formula are used:

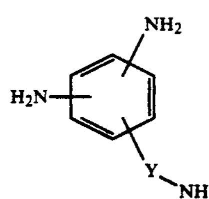

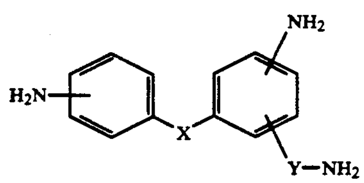

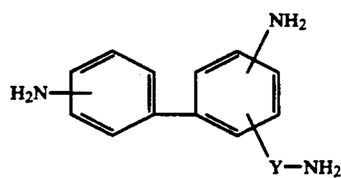

-continued

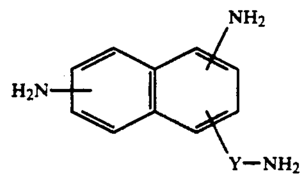

wherein Y represents $SO_2$ or CO, X represents O, $CH_2$, $SO_2$, S, CO etc., and one amino group and Y—$NH_2$ are located at ortho-position from each other. Actual examples of said compunds include 4,4'-diaminodiphenylether-3-sulfonamide, 3,4'-diaminodiphenylether-3'-sulfonamide, 3,3'-diaminodiphenylether-4-sulfonamide, 4,4'-diaminodiphenylmethane-3-sulfonamide, 3,4'-diaminodiphenylmethane-4-sulfonamide, 3,4'-diaminodiphenylmethane-3'-sulfonamide, 3,3'-diaminodiphenylmethane-4-sulfonamide, 4,4'-diaminodiphenylsulfon-3-sulfonamide, 3,4'-diaminodiphenylsulfon-4-sulfonamide, 3,4'-diaminodiphenylsulfon-3'-diaminodiphenylsulfon-3'-sulfonamide, 3,3'-diaminodiphenylsulfon-4-sulfonamide, 4,4'-diaminodiphenylsulfide-3-sulfonamide, 3,4'-diaminodiphenylsulfide-4'-sulfonamide, 3,3'-diaminodiphenylsulfide-4-sulfonamide, 3,4'-diaminodiphenylsulfide-3'-sulfonamide, 1,4-didaminobenzene-2-sulfonamide, 4,4'-diaminodiphenylether-3-carboxlic acid amide, 3,4'-diaminodiphenylether-4-carboxylic acid amide, 3,4'-diaminodiphenylether-3'-carboxylic acid amide, 3,3'-diaminodiphenylether-4-carboxylic acid amide, 4,4'-diaminodiphenylmethane-3-carboxylic acid amide, 3,4'-diaminodiphenylmethane-4-carboxylic acid amide, 3,4'-diaminodiphenylmethane-3'-carboxylic acid amide, 3,3'-diaminodiphenylmethane-4-carboxylic acid amide, 4,4'-diaminodiphenylsulfon-3-carboxylic acid amide, 3,4'-diaminodiphenylsulfon-4-carboxylic acid amide, 3,4'-diaminodiphenylsulfon-3'-carboxylic acid amide, 3,3'-diaminodiphenylsulfon-4-carboxylic acid amide, 4,4'-diaminodiphenylsulfide-3 -carboxylic acid amide, 3,4'-diaminodiphenylsulfide-4-carboxylic acid amide, 3,3'-diaminodiphenylsulfide-4-carboxylic acid amide, 3,4'-diaminodiphenylsulfide-3'-sulfonamide, 1,4-diaminobenzene-2-carboxylic acid amide, and the like.

These diaminoamide compounds may be also used in combination of two or more.

Amounts used of diaminoamide compounds are preferably 10–50 mol % based on the total mols of the diaminoamide compounds, diaminosiloxane (this is used if desired) and the other diamines. If amounts of the diaminoamide compounds are too small, effect of improving the heat-resistance property tends to become low. If the above amounts are too large, the precursor obtained by the present invention tends to have higher curing temperatures.

In order to increase adhesiveness of polyimide-isoindroquinazolinedione onto silicon wafers, glass or the like, a diaminosiloxane may be conveniently used.

Among diaminosiloxanes, there are preferred those represented by the general formula (III):

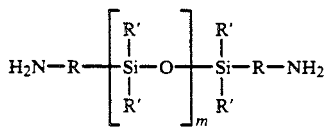

wherein R is divalent hydrocarbon group, R' is a monovalent hydrocarbon group, m is an integer of 1 or more, and two Rs and a plurality of R' may be same or different, respectively.

As diaminosiloxanes, the following specific compounds can be recited;

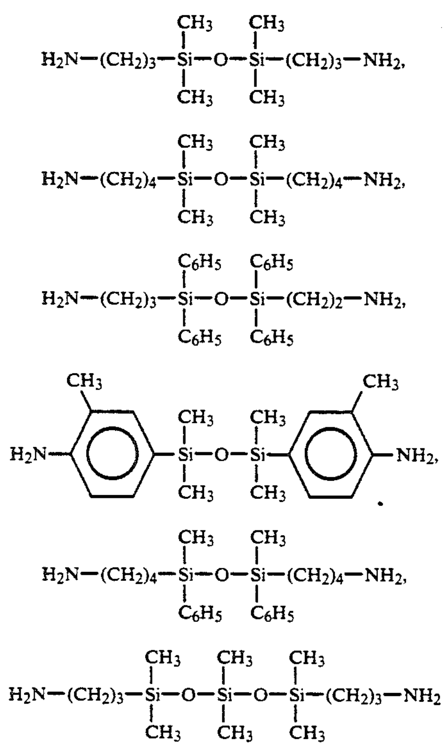

Diaminosiloxane is synthesized by, for example, the process shown in the specification of U.S. Pat. No. 3,185,719.

Two or more of diaminosiloxanes may be co-used. From the viewpoint of adhesiveness and etching processing proportion of copolymerizing diaminosiloxane may preferably be 0.2–10% by mol, more preferably 0.2–5% by mol based on the total mols of said diaminoamide compounds, diaminosyloxane and the other diamines.

Another diamines include aromatic diamines cush as 4,4'-diaminodiphenylether, 4,4'-diaminodiphenylmethane, 4,4'-diaminodiphenylsulfon, 4,4'-diaminodiphenylsufide, metha-phenylenediamine, para-phenylenediamine, 1,5-naphthalenediamine, 2,6-naphthalenediamine, etc., and aliphatic diamines such as hexamethylenediamine, 4,4'-diamino-3,3'-dimethyldicyclohexylmethane, etc. However, in view of heat-resistance property, aromatic diamine is more preferred.

Diaminoamide compound, diaminosiloxane (this may be used if necessary) and the other diamine are used in such a way as to be in the total of 100% by mol.

Polyimide-isoindroquinazolinedione precursor in the present invention is obtained by using the aforementioned tetracarboxylic acid dianhydride and the total of diaminoamide compound, diaminosiloxane and the other diamines in an equimolar or approximately equimolar amount to react them.

This reaction is conducted preferably in an organic solvent. As the organic solvent, organic polar solvent such as N,N-dimethylacetamide, N,N-dimethylformamide, N,N-diethylformamide, dimethylsulfoxide, hexamethylphosphoramide, and the like is preferred because the above precursor may be readily dissolved, and aromatic solvent such as toluene, cresol, phenol or the like may be co-used with the above organic polar solvent in such a degree as not to bar the dissolution of the above precursor. In this case, it is preferred to use 30% by weight or less of the aromatic solvent based on the total weight of the solvent used.

The above reaction is preferably conducted by firstly dissolving a diaminoamide compound, a diaminosiloxane (this is used if necessary) and the other amines into an organic solvent, and then adding thereto a tetracarboxylic acid dianhydride to react at below 80° C., preferably 0°–50° C. The reaction thereby promptly proceeds and viscosity of the reaction solution will gradually rise.

Polyimide-isoindroquinazolinedione can be obtained by the dehydration and ring closure (curing) of the precursor. The dehydration-ring closure can be conducted by the heat treatment at a temperature of 150°–250° C., preferably 170°–220° C. Upon the dehydration and ring closure, dehydrating agent such as acetic acid anhydride, phosphoric acid or the like may be used.

Formation of polyimide-isoindroquinazolinedione may be made after the reaction solution containing the polyimide-isoindroquinazolinedione precursor are applied, as it is or after concentration or dilution (i.e. preparing the precursor varnish), onto silicon wafer, glass plate, metal plate, etc. to form a film.

Etching of thus-obtained polyimide-isoindroquinazolinedione film can be effected according to conventional procedures using well-known etching solutions such as hydrazine, ethylenediamine mixture, tetramethylammonium hydroxide, etc.

Also, the afore-mentioned reaction solution containing the precursor can be used to make various protective coating films of semi-conductor devices, said films being useful when semi-conductor device is of a poor heat-resistance and requires etching processing.

Polyimide-isoindroquinazolinedione precursor has the constitutional units represented by the general formula (IV),

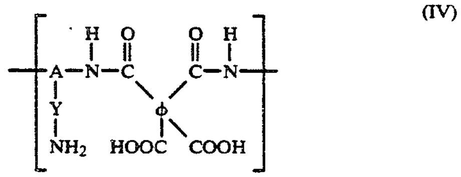

wherein Y is same as in the general formula (II), A is the residual group of diaminoamide compound and $\phi$ is the residual group of tetracarboxylic acid dianhydride; and by the general formula (V)

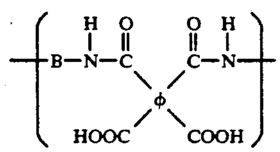

(V)

wherein B is the residual group of diaminosiloxane or the other diamines and $\phi$ is the residual group of tetracarboxylic acid dianhydride. Polyimide-isoindroquinazolinedione has the constitutional units represented by the general formula (VI),

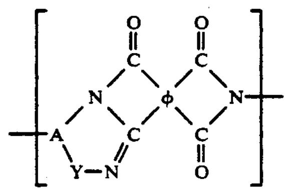

(VI)

wherein A, Y and $\phi$ have the same meanings as those as defined in the formula (IV); and by the general formula (VII),

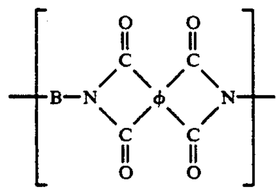

(VII)

wherein B and $\phi$ have the same meanings as those as defined in the general formula (V).

PREFERRED EMBODIMENTS OF THE INVENTION

Characteristics of the products obtained by the present process were estimated according to the following manner:

Adhesiveness

Treatment conditions of test pieces: 121° C., 2 atms (under saturated steam), for 100 hrs Estimation method: test pieces were estimated according to JIS-K-5400 by means of the "grid pattern test".

Mechanical Characteristics of Coating Film (Tensile Strength, Elongation, Modulus of Elasticity)

Test piece: breadth 10 mm, length 50 mm.

"Tensilon UTM-5T" produced by Toyo Baldwin K.K. was used to test the test pieces under the conditions of 30 mm of distance between fulera, 5 mm/min of tensile speed and room temperature as determination temperature.

Heat Decomposition Temperature

It was determined at 10° C./min. of temperature elevation speed by using a thermalgravimetric analyzer and relying on a tangential line method.

Curing Temperature

In order to prepare test samples, polyimideisoindroquinazolinedione precursor varnish was applied onto a glass plate, then the glass plate was dipped into a distilled water to release the above precursor film therefrom, which was followed by drying the film at 80° C., in vacuo such as under below 0.5 mm Hg to obtain the samples.

These samples were determined by using a thermalgravimetric analyzer as regards amounts of dehydration at various temperature to find a temperature at which amount of dehydration became constant.

SYNTHESIS EXAMPLE 1

Synthesis of Ethylene Glycol Bis-trimellitate Dianhydride (EBTA)

Into 2 l four-necked flask equipped with a stirrer, a thermometer, calcium chloride tube and a dropping funnel, 210.5 g (1.0 mol) of anhydrous trimellitic acid chloride and 1.3 l of benzene were added and dissolved. After anhydrous trimellitic acid chloride was completely dissolved, a mixed solution of 31 g (0.5 mol) of ethylene glycol, 79.1 g (1.0 mol) of pyridine and 600 ml of benzene was dropwise added to the solution within the flask in about 2 hrs, while inner temperature of the flask was maintained at 4°-6° C. After the addition was completed, the reaction was conducted for about 1 hour. The produced white crystal was filtered off and washed 3 times with methanol and further once with hexane. The product was purified by recrystallization 2 times with acetic acid anhydride to obtain a crystal having a melting point of 173°-175° C. with yield of 75.3%.

SYNTHESIS EXAMPLE 2

Synthesis of Trimethylenebistrimellitate Dianhydride (TBTA)

Procedure of Synthesis Example 1 was followed except of using 38 g (0.5 mol) of 1,3-propane diol in place of 31 g of ethylene glycol to synthesize the subject TBTA compound. The product having m.p. 200°-201° C. was obtained with yield of 76.9%.

SYNTHESIS EXAMPLE 3

Synthesis of Tetramethylene Glycol Bistrimellitate Dianhydride (TMBTA)

According to Synthesis Example 1, except that 45 g (0.5 mol) of 1,4-butane diol was used in place of 31 g of ethylene glycol, the subject TMBTA compound was synthesized. The product having m.p. 210°-211° C. was obtained with yield of 76.3%.

SYNTHESIS EXAMPLE 4

Synthesis of Pentamethylenebistrimellitate Dianhydride (PBTA)

The subject PBTA compound was synthesized according to Synthesis Example 1, except that 52.1 g (0.5 mol) of 1,5-pentane diol was used in place of 31 g of ethylene glycol. The product having m.p. 217°-218° C. was obtained with yield of 70.4%.

SYNTHESIS EXAMPLE 5

Synthesis of Heptamethylenebistrimellitate Dianhydride (HMBTA)

The subject HMBTA compound was synthesized according to Synthesis Example 1, except that 66 g (0.5 mol) of 1,7-heptane diol was used in place of 31 g of ethylene glycol. The product having m.p. 102°–103° C. was obtained with yield of 12.4%.

SYNTHESIS EXAMPLE 6

Synthesis of Octamethylenebistrimellitate Dianhydride (OBTA)

The subject OBTA compound was synthesized according to Synthesis Example 1, except that 73 g (0.5 mol) of 1,8-octane diol was used in place of 31 g ethylene glycol. The product having m.p. 131°–132° C. was obtained with yield of 35.0%.

SYNTHESIS EXAMPLE 7

Synthesis of Decamethylenebistrimellitate Dianhydride (DBTA)

The subject DBTA compound was synthesized according to Synthesis Example 1, except that 87.1 g (0.5 mol) of 1,10-decane diol was used in place of 31 g of ethylene glycol. The product having m.p. 133°–134° C. was obtained with yield of 47.8%.

The seven compounds obtained as above were confirmed respectively to be single component by means of high speed liquid chromatography under the following conditions:

Determination Conditions

Apparatus: HLC-801 Model manufactured by Toyo Soda K.K.

Solvent: tetrahydrofuran.

Column: one G2000H+three 3000H manuf. by Toyo Soda K.K.

Flow rate: 1 ml/min.

EXAMPLE 1

To a 500 ml four necked flask equipped with a thermometer, a stirrer and calcium chloride, 15.52 g (0.077 mol) of 4,4'-diaminodiphenylether (hereinafter abbreviated as DDE), 4.71 g (0.02 mol) of 4,4'-diamino diphenyl ether -3-carboxylic acid amide (hereinafter abbreviated as DDEC), 0.75 g (0.003 mol) of 12,3-bis(3-aminopropyl)-1,1,3,3-tetramethyldisiloxane and 351.2 g of N,N-dimethylacetoamide were charged and stirred until DDE and DDEC were dissolved. The content was ice-cooled, and then 41.0 g of ethylenebistrimellitate dianhydride (EBTA) was added thereto little by little so as not to exceed the temperature of 5° C. After the addition, stirring was continued at 5° C. for 5 hours. After that, it was reacted at 80° C. for 3 hours to obtain polyimide-isoindroquinazolinedione precursor varnish of about 50 poises viscosity.

This precursor varnish was spin-coated onto silicon wafers, which were then subjected to heat-treatment for 30 minutes at 100° C., 150° C. and 210° C., respectively, to manufacture silicon wafers having thereon coating film of polyimide-isoindroquinazolinedione in thickness of about 3 μm. When adhesiveness (adhesion property) of the coating films was estimated as regards of said silicon wafers, it was proved that the coating films were not peeled before or after 100 hour-treatment and their adhesiveness was excellent.

The above precursor varnish was applied by flow-coating on glass plates and then the plates were subjected to heat-treatment for 30 minutes at 100° C., 150° C. and 210° C., respectively, to make polyimideisoindroquinazolinedione coat films of about 3 μm in thickness on the glass plates, from which the coat films were peeled off to provide film samples for mechanical characteristics test. Coat films were separately made in the same manner as above, which were cut into pieces to provide them for determination of thermal decomposition temperature.

In addition, the above precursor varnish was spin-coated onto silicon wafers and then prebaked at 90° C. for 20 minutes and at 130° C. for 10 minutes to form partially cured resin coat films of 3 μm in thickness. Then, positive-type resist, OFPR-800 (produced by Tokyo Oka Co., Ltd.) was further coated thereon in thickness of 1.5 μm, which was followed by heat-treatment at 90° C. for 20 minutes, and thereafter, a hard mask was laid thereover, and finally the product was exposed under light quantity of 60 $mJ/cm^2$ (365 nm). When the exposed product was subjected to development and etching by using 3% aqueous solution of tetramethylammonium hydroxide, through-holes of 50 μm square were able to be bored. This was estimated as etching being possible.

Furthermore, the above precursor varnish was provided for determination of cure temperature.

The test results are shown in Table 1.

EXAMPLE 2

Example 1 was repeated, except that 0.003 mol of DDE was added in place of 1,3-bis(3-aminopropyl)-1,1,3,3-tetramethyldisiloxane, to produce polyimide-isoindroquinazolinedione precursor varnish, which was further tested. The results are shown in Table 1.

Comparative Example 1

Except that 0.02 mol of DDE was added in place of DDEC, Example 1 was traced to produce the polyimide precursor varnish which was then tested. The results were shown in Table 1.

EXAMPLE 3

Polyimide-isoindroquinazolinedione precursor varnish was produced in such a manner as in Example 1, except of replacing 41.0 g of the acid dianhydride (EBTA) with 43.8 g of tetramethylene bistrimellitate dianhydride (TMBTA), and then tested. The results are shown in Table 1.

EXAMPLE 4

Polyimide-isoindroquinazolinedione precursor varnish was produced in a manner similar to that of Example 1 except of replacing 41.0 g of the acid dianhydride (EBTA) with 75.9 g of decamethylene bistrimellitate dianhydride (DBTA), and then tested. The results are shown in Table 1.

EXAMPLE 5

Polyimide-isoindroquinazolinedione precursor varnish was produced in such a manner as in Example 1 except of replacing 41.0 g of the acid dianhydride (EBTA) with a mixture of 36.54 g of decamethylene bistrimellitate dianhydride (DBTA) and 9.66 g of 3,3',4,4'-benzophenone tetracarboxylic acid dianhydride (BPTA), and then tested. The results are shown in Table 1.

Comparative Example 2

To a 500 ml four-necked flask equipped with a thermometer, a stirrer and calcium chloride tube, 16.0 g of DDE, 4.86 g of DDEC and 300.7 g of N,N-dimethylacetoamide were charged, and stirred until the DDE and DDEC were dissolved. The content was ice-cooled, and then 32.2 g of 3,3',4,4'-benzophenone tetracarboxylic acid dianhydride was little by little added thereto so as not to exceed a temperature of 5° C. After the addition was completed, stirring was continued at 5° C. for 5 hours. Thereafter, the mixture was reacted at 80° C. for 2 hours to obtain polyimide-isoindroquinazolinedione precursor varnish having viscosity of 25 poises. This precursor varnish was spin-coated onto silicon wafers, which were then subjected to heat-treatment at 100° C., 200° C. and 350° C. for 30 minutes, respectively, to manufacture samples for the estimation of adhesiveness. The tests were conducted in the similar manner to that of Example 1, except that as the prebaking condition in the estimation of etching property, 90° C. for 20 minutes and then 180° C. for 20 minutes were adopted. The test results are shown in Table 1.

TABLE 1

| | | Test Results | | | | | | | |
|---|---|---|---|---|---|---|---|---|---|
| | | Adhesiveness | | | | Physical properties of coat film | | | |
| | Acid dianhydride | Before 100 hrs treatment | After 100 hrs treatment | Etching property | Heat-decomp. temperature (°C.) | Tensile strength (kgf/mm²) | Elongation (%) | Modulus of elasticity (kgf/mm²) | Curing temperature (°C.) |
| Example 1 | EBTA | good | good | possible | 395 | 14.5 | 13 | 210 | 200 |
| Example 2 | " | " | entirely peeled off | " | 395 | 14.2 | 13.5 | 210 | 200 |
| Comparative Example 1 | " | " | excellent | " | 375 | 9.9 | 9 | 195 | 170 |
| Example 3 | TMBTA | " | excellent | " | 390 | 11.9 | 9.9 | 190 | 180 |
| Example 4 | DBTA | " | excellent | " | 390 | 7.4 | 6.0 | 160 | 150 |
| Example 5 | DBTA BPTA | " | excellent | " | 400 | 12.3 | 11.4 | 200 | 200 |
| Comparative Example 2 | BPTA | entirely peeled off | entirely peeled off | " | 430 | 11.1 | 11.6 | 320 | 345 |

As is clear from Table 1, the samples obtained in Example 1 are superior in adhesiveness to those of Example 2 using no diaminosiloxane, and those of Examples 1 and 2 have much better tensile strength than those of Comparative Example 1 using no DDEC. Further, as compared with the samples of Comparative Example 2 using only 3,3',4,4'-benzophenonetetracarboxylic acid as dianhydride and not using diaminosilicone, those of Examples 1-5 are not only remarkably lower in curing temperature and elasticity, but also superior in adhesiveness.

EXAMPLE 6

To a 500 ml four-necked flask equipped with a thermometer, a stirrer and a calcium chloride tube, 15.52 g (0.077 mol) of DDE, 4.71 g (0.02 mol) of DDEC, 0.75 g (0.003 mol) of 1,3-bis(3-aminopropyl)-1,1,3,3-tetramethyldisiloxane and 227.6 g of N,N-dimethylacetamide (hereinafter abbreviated as DMAc) were charged and stirred until DDE and DDEC were dissolved. The content was ice-cooled, and then 41.0 g (0.1 mol) of ethylenebistrimellitate dianhydride (EBTA) were added thereto little by little so as not to exceed the temperature of 5° C. After the addition, stirring was continued to obtain polyimide-isoindroquinazolinedione precursor varnish (solid content 21.4% by weight) having viscosity of 15.6 poises (at 25° C.).

This precursor varnish was spin-coated onto silicon wafers, which were then subjected to heat-treatments at 150° C., 200° C. and 250° C. for 30 minutes to manufacture silicon wafers coated with polyimide-isoindroquinazolinedione film in thickness of about 10 μm. These silicon wafers were used to be subjected to estimation of adhesiveness.

The above precursor varnish was flow-coated onto glass plates, which were subjected to the heat-treatments at 150° C., 200° C. and 250° C. for 30 minutes, respectively to prepare polyimide-isoindroquinazolinedione coating films in thickness of about 10 μm. The films were peeled off from the glass plates to be subjected to mechanical characteristics test of the coating films. The likewise prepared coating films were chopped up to be subjected to determination of head decomposition temperature.

The above precursor varnish was used for the determination of etching property and curing temperature according to the procedure of Example 1.

These test results obtained are shown in Table 2.

Comparative Example 3

Procedures of Example 6 were followed, except that DDEC was not used, DDE was added in additional amount of 0.02 mol and DMAc solvent was used in amounts of 181.3 g, to obtain polyimide precursor varnish (solid content 25.6% by weight) whose viscosity was 1.8 poises (at 25° C.). After that, the test was conducted according to Example 6. The test results were shown in Table 2.

EXAMPLE 7

Procedures of Example 6 were followed, except that the acid dianhydride was replaced with 42.4 g (0.1 mol) of trimethylenebistrimellitate dianhydride (TBTA) and amounts used of the DMAc solvent were 181.3 g, to obtain polyimide-isoindroquinazolinedione precursor varnish (solid content 25.9% by weight) whose viscosity was 16.6 poises (at 25° C.). After that, test was made according to Example 6. The test results are shown in Table 2.

EXAMPLE 8

Procedures of Example 6 were followed, except that the acid dianhydride was replaced with 43.8 g (0.1 mol) of tetramethylenebistrimellitate dianhydride and amounts used of the DMAc solvent were 185.6 g, to obtain polyimide-isoindroquinazolinedione precursor varnish (solid content 23.1% by weight), whose viscosity was 1.5 poises (at 25° C.). After that, test was made according to Example 6. The test results are shown in Table 2.

EXAMPLE 9

Procedures of Example 6 were followed, except that the acid dianhydride was replaced with 45.2 g (0.1 mol) of pentamethylenebistrimellitate dianhydride and amounts used of the DMac solvent were 28.85 g, to obtain polyimide-isoindroquinazolinedione precursor varnish (solid content 18.8% by weight), whose viscosity was 16.5 poises (at 25° C.). After that, test was made according to Example 6. The test results are shown in Table 2.

EXAMPLE 10

Procedures of Example 6 were followed, except that the acid dianhydride was replaced with 48.0 g (0.1 mol) of heptamethylenebistrimellitate dianhyride (HMBTA) and amounts used of the DMac solvent were 248.9 g, to obtain polyimide-isoindroquinazolinedione precursor varnish whose viscosity was 3.0 poises (at 25° C.) After that, test was made according to Example 6. The test results are shown in Table. 2.

EXAMPLE 11

Procedures of Example 6 were followed, except that the acid dianhydride was replaced with 49.4 g (0.1 mol) of octamethylenebistrimellitate dianhydride and amounts used of the DMAc solvent was 198.2 g, to obtain polyimide-isoindroquinazolinedione precursor varnish (solid content 20.1% by weight), whose viscosity was 11.2 poises (at 25° C.). After that, test was made according to Example 6. The test results are shown in Table 2.

EXAMPLE 12

Procedures of Example 6 were followed, except that the acid dianhydride was replaced with 52.2 g (0.1 mol) of decamethylenebistrimellitate dianhydride (DBTA) and amounts used of the DMAc solvent were 290.9 g, to obtain polyimide-isoindroquinazolinedione precursor varnish (solid content 20.1% by weight, whose viscosity was 1.7 poises (at 25° C.). After that, test was made according to Example 6. The test results are shown in Table 2.

COMPARATIVE EXAMPLE 4

To a 500 ml four necked flask equipped with a thermometer, a stirrer and calcium chloride tube, 16.0 g of DDE, 4.86 g of DDEC and 300.7 g of N,N-dimethylacetamide were added and stirred till DDE and DDEC were dissolved. The content was ice-cooled and then 29.4 g of 3,3',4,4'-biphenyltetracarboxylic acid dianhydride (BPDA) were added little by little so as not to exceed the temperature of 5° C.. After the addition was finished, stirring was continued at 5° C. for 5 hours, and thereafter, the reaction was conducted for 2 hours to obtain polyimide-isoindroquinazolinedione precursor varnish having viscosity of 12.7 poises. This precursor varnish was spin-coated onto silicon wafers, which were then heat-treated respectively at 100° C., 200° C., 250° C. and 350° C. for 30 minutes to prepare samples for estimation of adhesiveness.

In addition, the test was conducted, in which the procedure of Example 6 was followed except that the prebaking conditions for estimation of etching property were set at 90° C. for 20 minutes and then at 180° C. for 20 minutes. The test results are shown in Table 2.

TABLE 2

| | | Test Results | | | | | | | | |
|---|---|---|---|---|---|---|---|---|---|---|
| | | Adhesiveness | | | | Mechanical characteristics of coat film | | | | |
| | Dianhydride used | Before 100 hr-treatment | After 100 hr-treatment | Etching property | Heat decomp. temperature (°C.) | Tensile strength (kgf/mm²) | Elongation (%) | Modulus of elasticity (kgf/mm²) | Curing temp. (°C.) |
| Example 6 | EBTA | excellent | excellent | possible | 380 | 9.5 | 7.8 | 212 | 200 |
| Comparative Example 3 | EBTA | excellent | excellent | " | 377 | 7.7 | 6.7 | 205 | 200 |
| Example 7 | TBTA | excellent | excellent | " | 360 | 9.3 | 6.5 | 204 | 180 |
| Example 8 | TMBTA | excellent | excellent | " | 347 | 9.3 | 9.0 | 189 | 180 |
| Example 9 | PBTA | excellent | excellent | " | 365 | 7.9 | 7.1 | 171 | 170 |
| Example 10 | HMBTA | excellent | excellent | " | 356 | 6.8 | 7.4 | 149 | 150 |
| Example 11 | OBTA | excellent | excellent | " | 348 | 6.5 | 10.7 | 141 | 150 |
| Example 12 | DBTA | excellent | excellent | " | 348 | 6.3 | 24.8 | 133 | 150 |

TABLE 2-continued

| | Dianhydride used | Test Results: Adhesiveness: Before 100 hr-treatment | Adhesiveness: After 100 hr-treatment | Etching property | Heat decomp. temperature (°C.) | Mechanical characteristics of coat film: Tensile strength ($kgf/mm^2$) | Elongation (%) | Modulus of elasticity ($kgf/mm^2$) | Curing temp. (°C.) |
|---|---|---|---|---|---|---|---|---|---|
| Comparative Example 4 | BPDA | fully peeled off | fully peeled off | " | 492 | 12.5 | 9.7 | 315 | 350 |

The results shown in Table 2 were due to the use of polyimide-isoindroquinazolinedione precursor and polyimide precursor, which have relatively lower molecular weights. The sample of Example 6 (use of EBTA) is superior in tensile strength to that of Comparative Example 3 (no use of DDEC), and the samples of Examples 6–13 are more excellent in low curing temperature and elasticity than the sample of Comparative Example 4 (use of 3,3',4,4'-biphenyltetracarboxylic acid dianhydride).

The polyimide-isoindroquinazolinedione precursor obtained by the present invention can be converted to polyimidoisoindroquinazoline at a low curing temperature. Since thus-obtained polyimide-isoindroquinazolinedione has excellent properties of etching processing and close adherence, it is very useful as electric insulation materials and protective coating materials of electronic device parts, which are subjected to etching processing in their production processes and have a poor heat-resistance. Furthermore, the above polyimide-isoindroquinazolinedione exhibits an excellent tensile strength and a low elasticity.

The polyimide-isoindroquinazolinedione obtained by the present invention is well-balanced in these characteristics.

We claim:

1. A process for the preparation of a polyimide-isoindroquinazolinedione precursor which comprises reacting (a) a tetracarboxylic acid dianhydride containing at least 50% by mol of the dianhydride represented by the general formula (I):

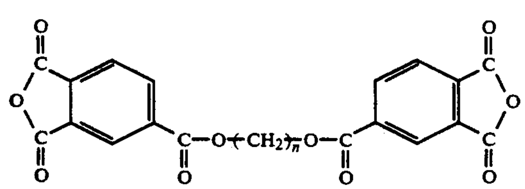

wherein n represents an integer of 2–16, (b) a diaminoamide compound represented by the general formula (II):

$$H_2N-Ar(NH_2)-Y-NH_2 \quad (II)$$

wherein Ar represents an aromatic group, Y represents $-SO_2-$ or $$-\underset{\parallel}{\overset{}{C}}- \text{(C=O)},$$

and at least the $Y-NH_2$ group and at least one $-NH_2$ group are bonded to carbon atom adjacent to the Ar, and (c) an another diamine; said polyimide-isoindroquinazolinedione precursor having the constitutional units represented by the general formula (IV):

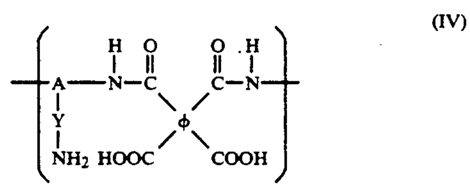

wherein Y is same as in the general formula (II), A is the residual group of the diaminoamide compound and $\phi$ is the residual group of the tetracarboxylic acid dianhydride and by the general formula (V):

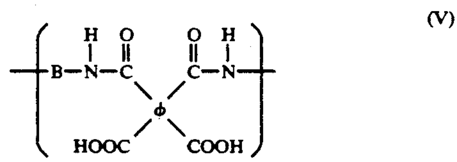

wherein B is the residual group of the another diamine and $\phi$ is the residual group of the tetracarboxylic acid anhydride.

2. The process according to claim 1, further comprising reacting 0.2–10% by mole of diaminosiloxane, based on the total mols of diaminoamide compound, diaminosiloxane and the another diamine to form said precursor.

3. The process according to claim 1, wherein said another diamine is an aromatic diamine.

4. A process for the preparation of a polyimide-isoindroquinazolinedione comprising preparing a polyimide-isoindroqinazolinedione precursor by the process according to claim 1 or 2, and then dehydrating said precursor to cause its ring-closure.

5. The process according to claim 4, wherein said polyimide-isoindroquinazoline precursor is made into a film, and then the film is subjected to dehydration for ring-closure.

6. A process according to claim 1, wherein said precursor is formed by reacting a mixture consisting essentially of components (a), (b) and (c).

7. A process according to claim 5, wherein said precursor is formed by reacting a mixture consisting essentially of components (a), (b) and (c), as well as the diaminosiloxane.

8. A process according to claim 1, wherein the reaction is conducted at a temperature lower than 80° C.

9. A process according to claim 3 or 4, wherein the dehydration-ring closure is conducted at a temperature of 150° to 250° C.

10. A process according to claim 1, wherein the tetracarboxylic acid dianhydride represented by the general formula (I) is at least one compound selected from the group consisting ethylenebistrimellitate dianhydride, trimethylenebistrimellitate dianhydride, tetramethylenebistrimellitate dianhydride, pentamethylenebistrimellitate dianhydride, hexamethylenebistrimellitate dianhydride, heptamethylenebistrimellitate dianhydride, octamethylenebistrimellitate dianhydride, decamethylenebistrimellitate dianhydride and hexadecamethylenebistrimellitate dianhydride, and other acid anhydrides making up component (a) are selected from the group consisting of pyromellitic acid dianhydride, 3,3',4,4'-diphenyltetracarboxylic acid dianhydride, 3,3',4,4'benzophenonetetracarboxylic acid dianhydride, cyclopentanetetracarboxylic acid anhydride, 1,2,5,6-naphthalenetetracarboxylic acid dianhydride, 2,3,6,7-naphthalenetetracarboxylic acid dianhydride, 2,3,5,6-pyridinetetracarboxylic acid dianhydride, 1,4,5,8-napthalenetetracarboxylic acid dianhydride, 3,4,9,10-perylenetetracarboxylic acid dianhydride, 4,4'-sulfonyldiphthalic acid dianhydride and a mixture thereof.

11. A process according to claim 10, wherein the diaminoamide compounds represented by the general formula (II) are selected from the group consisting of 4,4'-diaminodiphenylether-3-sulfonamide, 3,4'-diaminodiphenylether-3'-sulfonamide, 3,3'-diaminodiphenylether-4sulfonamide, 4,4'-diaminodiphenylsulfon-3-sulfonamide, 3,4'diaminodiphenylsulfon-4-sulfonamide, 3,4'-diaminodiphenylsulfon-3'-sulfonamide, 3,3'-diaminodiphenylsulfon-4-sulfonamide, 4,4'-diaminodiphenylsulfide-3-sulfonamide, 3,4'-diaminodiphenylsulfide-4'-sulfonamide, 3,3'-diaminodiphenylsulfide-4sulfonamide, 3,4'-diaminodiphenylsulfide-3'-sulfonamide, 1,4-diaminobenzene-2-sulfonamide, 4,4'-diaminodiphenylether-3-carboxylic acid amide, 3,4-diaminodiphenylether-4-carboxylic acid amide, 3,4'-diaminodiphenylether-3'-carboxylic acid amide, 3,3'-diaminodiphenylether-4-carboxylic acid amide, 4,4'-diaminodiphenylmethane-3-carboxylic acid amide, 3,4'-diaminodiphenylmethane-4-carboxylic acid amide, 3,4'-diaminodiphenyl-methane-3'-carboxylic acid amide, 3,3'-diaminodiphenylmethane-4-carboxylic acid amide, 4,4'-diaminodiphenylsulfon-3-carboxylic acid amide, 3,4'-diaminodiphenylsulfon-4-carboxylic acid amide, 3,4'-diaminodiphenylsulfon-3'-carboxylic acid amide, 3,3'-diaminodiphenylsulfon-4-carboxylic acid amide, 4,4'-diaminodiphenylsulfide-3-carboxylic acid amide, 3,4'-diaminodiphenylsulfide-4-carboxylic acid amide, 3,3'-diaminodiphenylsulfide-4-carboxylic acid amide, 3,4'-diaminodiphenylsulfide-3'-carboxylic acid amide and 1,4-diaminobenzene-2carboxylic acid amide.

12. A process according to claim 11, wherein the another diamine is a member selected fro the group consisting of 4,4'-diaminodiphenylether, 4,4'-diaminodiphenylmethane, 4,4'-diaminodiphenylsulfide, methaphenylenediamine, paraphenylenediamine, 1,5-naphthalenediamine, 2,6-naphthalenediamine, hexamethylenediamine and 4,4'-diamino-3,3'-dimethyldicyclohexylmethane.

13. A process according to claim 8, wherein the reaction is conducted in an organic solvent.

* * * * *